US012747702B2

(12) United States Patent
Schafer

(10) Patent No.: US 12,747,702 B2
(45) Date of Patent: Sep. 29, 2026

(54) SYSTEM AND METHOD FOR GAS TURBINE ENGINE ROTOR BOW MITIGATION

(71) Applicant: Raytheon Technologies Corporation, Farmington, CT (US)

(72) Inventor: Bradley C. Schafer, Ellington, CT (US)

(73) Assignee: RTX Corporation, Farmington, CT (US)

( * ) Notice: Subject to any disclaimer, the term of this patent is extended or adjusted under 35 U.S.C. 154(b) by 108 days.

(21) Appl. No.: 17/506,986

(22) Filed: Oct. 21, 2021

(65) Prior Publication Data

US 2023/0129383 A1 Apr. 27, 2023

(51) Int. Cl.
*F02C 7/36* (2006.01)
*F02C 9/18* (2006.01)

(52) U.S. Cl.
CPC .................. *F02C 7/36* (2013.01); *F02C 9/18* (2013.01); *F05D 2220/323* (2013.01); *F05D 2260/941* (2013.01)

(58) Field of Classification Search
CPC .... F02C 7/36; F02C 7/26; F02C 7/268; F02C 9/18; F05D 2220/323; F05D 2260/941; F05D 2260/85; F01D 25/34; F01D 25/24; F01D 19/02
See application file for complete search history.

(56) References Cited

U.S. PATENT DOCUMENTS 3,684,039 A * 8/1972 Coyne .................... E21B 19/146 175/85
4,018,094 A * 4/1977 Schmidt .................. F01D 25/34 74/126
4,919,039 A * 4/1990 Nutter ................... F15B 15/061 91/40
5,178,028 A * 1/1993 Bossler, Jr. ............ B64D 35/04 74/665 GC
9,353,839 B2 * 5/2016 Bastier ...................... F16H 1/06
(Continued)

FOREIGN PATENT DOCUMENTS

EP 2757230 A1 7/2014
EP 3382182 A1 * 10/2018 ............. F01D 25/36
JP H062570 A 1/1994

OTHER PUBLICATIONS

Extended European Search Report dated Mar. 2, 2023 for corresponding application EP22201311.
(Continued)

*Primary Examiner* — Nathaniel E Wiehe
*Assistant Examiner* — Joshua R Beebe
(74) *Attorney, Agent, or Firm* — Bachman & LaPointe, P.C.

(57) ABSTRACT

A rotor bow mitigation system for a gas turbine engine includes a control system in communication with an actuator, the control system actuates a power source to repeatedly actuate the actuator for a duration of time to intermittently rotate a rotary component such as a high spool of the gas turbine engine. A method of rotor bow mitigation for a gas turbine engine includes intermittently actuating an actuator of a rotor bow mitigation system in selective mechanical connection with a gear within an accessory gearbox to intermittently rotate the rotary component of the gas turbine engine to mitigate rotor bow conditions.

18 Claims, 7 Drawing Sheets

(56) References Cited

U.S. PATENT DOCUMENTS

| | | | | |
|---|---|---|---|---|
| 9,664,070 | B1 * | 5/2017 | Clauson | F01D 25/36 |
| 10,174,678 | B2 | 1/2019 | Schwarz et al. | |
| 10,358,936 | B2 | 7/2019 | Hockaday et al. | |
| 10,495,003 | B1 * | 12/2019 | Slayter | F02C 7/268 |
| 10,724,443 | B2 | 7/2020 | Hon et al. | |
| 2014/0318144 | A1 | 10/2014 | Lazzeri et al. | |
| 2017/0234230 | A1 * | 8/2017 | Schwarz | F02C 3/04<br>60/778 |
| 2019/0186359 | A1 * | 6/2019 | Stevenson | F02C 7/32 |
| 2019/0300200 | A1 * | 10/2019 | Himmelmann | F02C 6/08 |

OTHER PUBLICATIONS

Office Action issued in corresponding European Patent Application No. 22 201 311.2, dated Mar. 19, 2025.

* cited by examiner

SYSTEM AND METHOD FOR GAS TURBINE ENGINE ROTOR BOW MITIGATION

BACKGROUND

The present disclosure relates to a gas turbine engine and, more particularly, to managing rotor bow conditions.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

When the gas turbine engine is shut down, uneven cooling that occurs between the upper and lower half of the engine generates a thermal gradient. As the hot compressor rotor drum and casing cool and contract in the presence of this thermal gradient, they may do so non-uniformly and may bend slightly, in a phenomenon referred to as rotor bow. The bowing can become evident in a manner of minutes and may last for several hours, depending on the engine concerned. If the engine is started while rotor bow is present, there may be a concern to operational capability.

SUMMARY

A rotor bow mitigation system for a gas turbine engine according to one disclosed non-limiting embodiment of the present disclosure includes a control system in communication with an actuator, wherein the control system actuates a power source to repeatedly actuate the actuator for a duration of time to intermittently rotate a rotary component of the gas turbine engine.

A further embodiment of any of the foregoing embodiments of the present disclosure includes wherein the actuator is a linear actuator.

A further embodiment of any of the foregoing embodiments of the present disclosure includes a ratchet wheel driven by the linear actuator, and a pawl that extends from a piston of the linear actuator.

A further embodiment of any of the foregoing embodiments of the present disclosure includes, wherein the pawl selectively engages the ratchet wheel upon extension of the piston.

A further embodiment of any of the foregoing embodiments of the present disclosure includes, wherein the pawl is not in contact with the ratchet wheel when the piston is in a retracted position.

A further embodiment of any of the foregoing embodiments of the present disclosure includes, wherein the pawl selectively engages the ratchet wheel upon retraction of the piston.

A further embodiment of any of the foregoing embodiments of the present disclosure includes, wherein the ratchet wheel extends from a gear of an external gearbox.

A further embodiment of any of the foregoing embodiments of the present disclosure includes, wherein the gear drives a towershaft connected to the rotary component.

A further embodiment of any of the foregoing embodiments of the present disclosure includes, wherein the power source is pneumatic, hydraulic or electric.

A further embodiment of any of the foregoing embodiments of the present disclosure includes, wherein the rotary component is a high spool of the gas turbine engine.

A gas turbine engine according to one disclosed non-limiting embodiment of the present disclosure includes a towershaft mechanically connected to the rotary component and the external gearbox; and a rotor bow mitigation system in selective mechanical connection with the external gearbox, wherein the rotor bow mitigation system is configured to repeatedly actuate an actuator to intermittently rotate the rotary component of the gas turbine engine to mitigate rotor bow conditions.

A further embodiment of any of the foregoing embodiments of the present disclosure includes, wherein the external gearbox is an accessory gearbox.

A further embodiment of any of the foregoing embodiments of the present disclosure includes, wherein the rotary component is a high spool of the gas turbine engine.

A further embodiment of any of the foregoing embodiments of the present disclosure includes, wherein the actuator is a linear actuator.

A further embodiment of any of the foregoing embodiments of the present disclosure includes a Full Authority Digital Engine Control (FADEC) in communication with the rotor bow mitigation system to actuate a power source in communication with the rotor bow mitigation system to repeatedly actuate the linear actuator for a duration of time to intermittently rotate the rotary component of the gas turbine engine.

A further embodiment of any of the foregoing embodiments of the present disclosure includes a ratchet wheel within the external gearbox, the ratchet wheel driven by the actuator to drive a gear meshed with a gear train of the external gearbox, wherein the gear is mounted to a gear shaft that includes a mechanism that permits the gear to be rotated by the rotor bow mitigation system but is otherwise disconnected from the gear train so that the entirety thereof need not be driven by the rotor bow mitigation system.

A further embodiment of any of the foregoing embodiments of the present disclosure includes, wherein the gear is a spiral bevel gear that drives the accessory gear train.

A method of rotor bow mitigation for a gas turbine engine according to one disclosed non-limiting embodiment of the present disclosure includes identifying a potential rotor bow condition; determining a duration for a rotor bow mitigation cycle; and intermittently actuating an actuator of a rotor bow mitigation system in selective mechanical connection with a gear within an accessory gearbox to intermittently rotate a rotary component of the gas turbine engine to mitigate rotor bow conditions.

A further embodiment of any of the foregoing embodiments of the present disclosure includes, wherein identifying a potential rotor bow condition comprises obtaining temperature data from a sensor located adjacent to an upper portion of the rotary component and a sensor located adjacent to a lower portion of the rotary component to obtain a temperature difference therebetween.

A further embodiment of any of the foregoing embodiments of the present disclosure includes, wherein intermittently actuating the linear actuator utilizes bleed air from the gas turbine engine collected in an accumulator which is then released intermittently.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
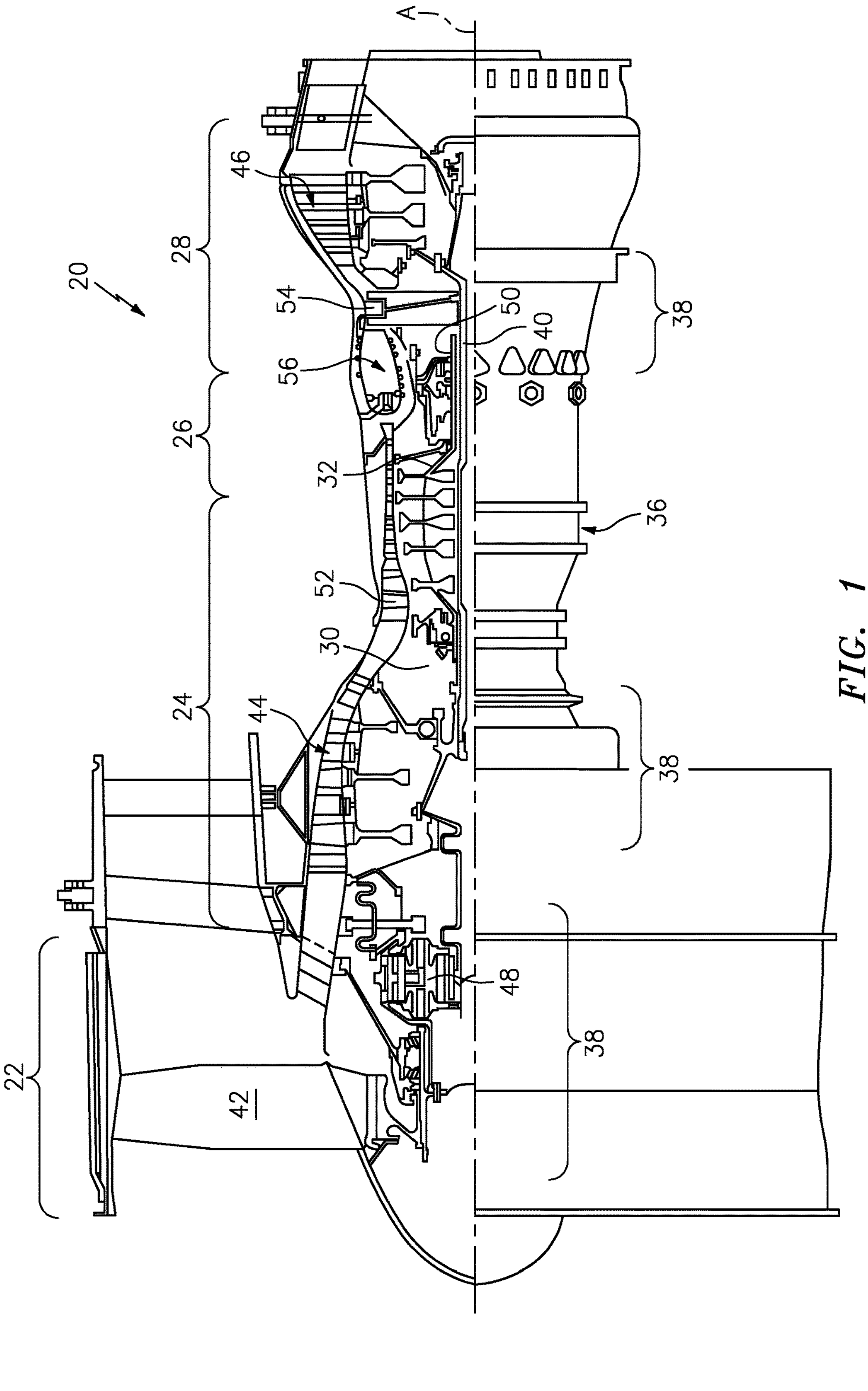
FIG. 1 is a schematic cross-section of an example gas turbine engine architecture.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26, then expansion through the turbine section 28. Although depicted as a turbofan in the disclosed non-limiting embodiment, it should be appreciated that the concepts described herein are not limited to use with turbofans as the teachings may be applied to other turbine engine architectures.

The engine 20 generally includes a low spool 30 and a high spool 32 mounted for rotation about an engine central longitudinal axis A relative to an engine case structure 36 via several bearing compartments 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The HPT 54 and the LPT 46 rotationally drive the respective high spool 32 and low spool 30 in response to the expansion.

The present disclosure addresses rotor bow conditions. In the disclosed embodiment, this is done with focus on high spool 32. Gas turbine engines may have a range of different shaft and spool geometries, including one-spool, two-spool and three-spool configurations, in both co-rotating and counter-rotating designs. Gas turbine engines may also be configured as low bypass turbofan, open-rotor turbofan, ducted or un-ducted propeller engines, turboshaft configurations or as an industrial gas turbine. It should be appreciated that the rotor bow mitigation disclosed herein can be beneficially utilized to mitigate rotor bow in any rotary component such as a spool or rotor or the like in any of these and other gas turbine engines.

Figure 2:
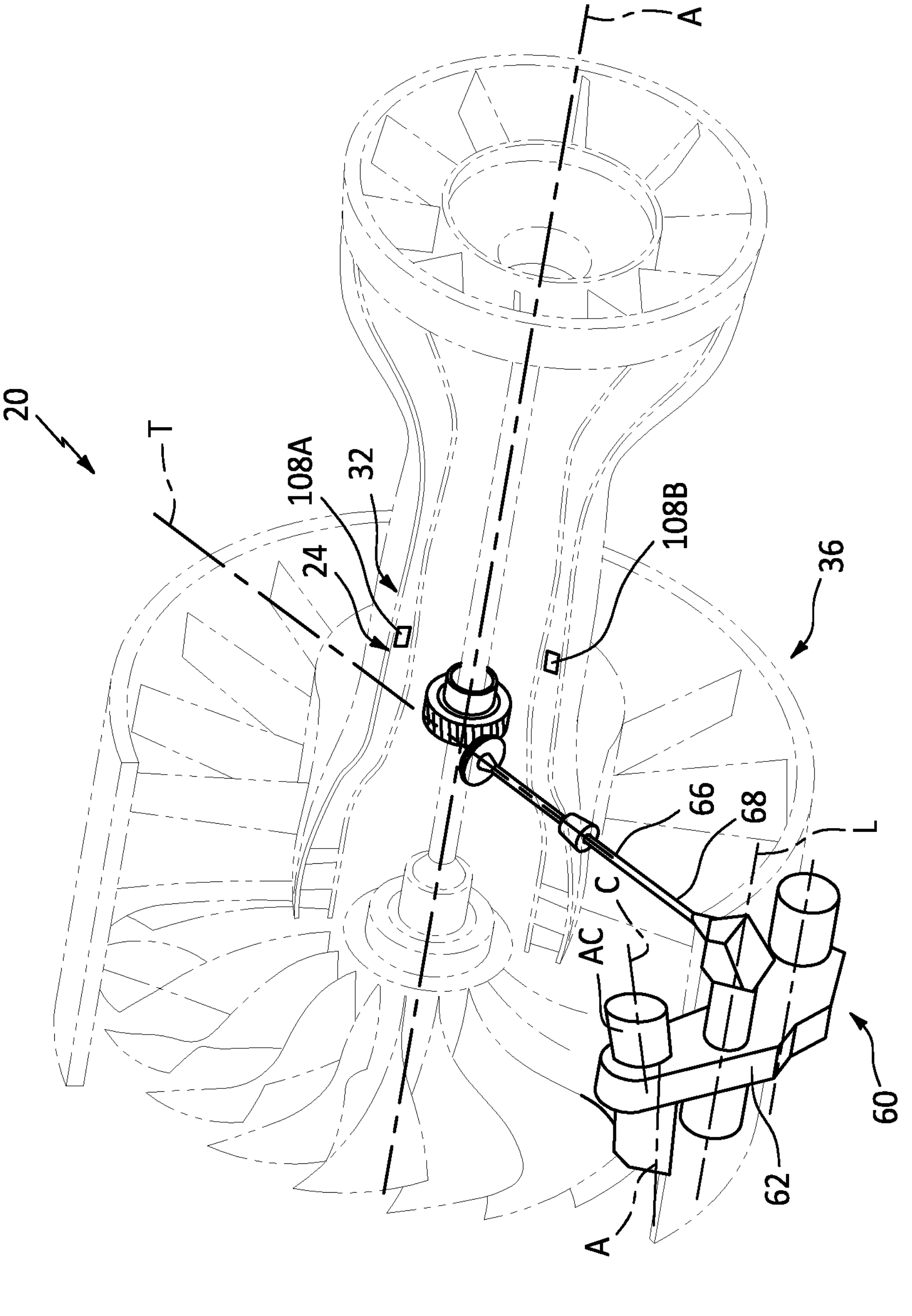
FIG. 2 is a partial phantom view of the example gas turbine engine illustrating an accessory gearbox system mechanically connected with a high spool of the gas turbine engine.

With reference to FIG. 2, an external gearbox 60 such as an accessory drive gearbox can be mounted to the engine case structure 36 along an accessory gearbox axis L generally parallel to the engine axis of rotation A. Accessory drive gearboxes are often mounted beneath the engine, proximate the combustor, or beneath a cylindrical fan case surrounding the fan. It should be appreciated that any external gearbox such as the external gearbox 60, high speed gearbox, low speed gearbox and others may be utilized herein.

The external gearbox 60 supports accessory components (ACs) such as, for example, an air turbine starter, a de-oiler, a hydraulic pump, an engine lubrication pump, an integrated drive generator, a permanent magnet alternator, a fuel pump module, and others. Each accessory component typically has an input shaft that defines an axis of rotation C parallel or at least generally parallel to axis L. It should be appreciated that any number and type of accessory components AC may alternatively or additionally be provided. The external gearbox 60 allows each accessory component AC to be driven at an optimum speed and in an accessible location for ease of maintenance, reduced weight and minimum complexity.

A towershaft 66 that passes through, for example, an engine strut 68 is mechanically engaged via gears with the high spool 32 in the vicinity of the compressor section 24. The towershaft 66 defines a towershaft axis of rotation T generally transverse to the engine axis of rotation A.

Figure 3:
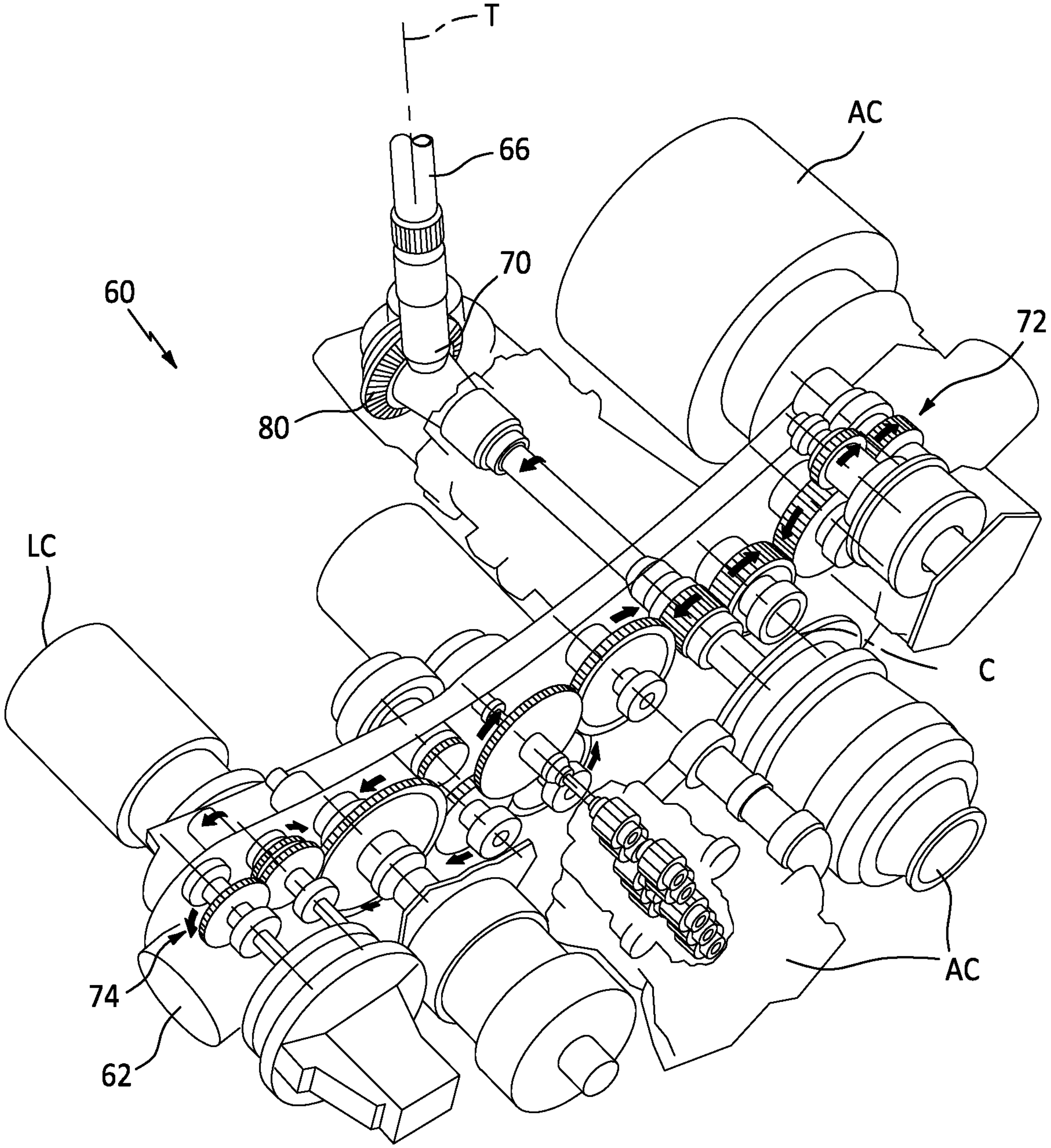
FIG. 3 is a partial phantom view of the accessory gearbox system.

With reference to FIG. 3, the towershaft 66 may include a towershaft bevel gear 70 that drives an accessory gear train 72 contained and supported within an accessory drive gearbox casing 62. The accessory gear train 72, in one embodiment, includes a polygonal transmission with associated gears 74 and supporting bearings to provide the required accessory component input speed and power. In one example, the gears 74 may be arranged along respective axes C that are transverse to the axis T of the towershaft 66 and parallel to the engine longitudinal axis A. The towershaft bevel gear 70 may interface with a spiral bevel gear 80 that then drives the accessory gear train 72.

Figure 4:
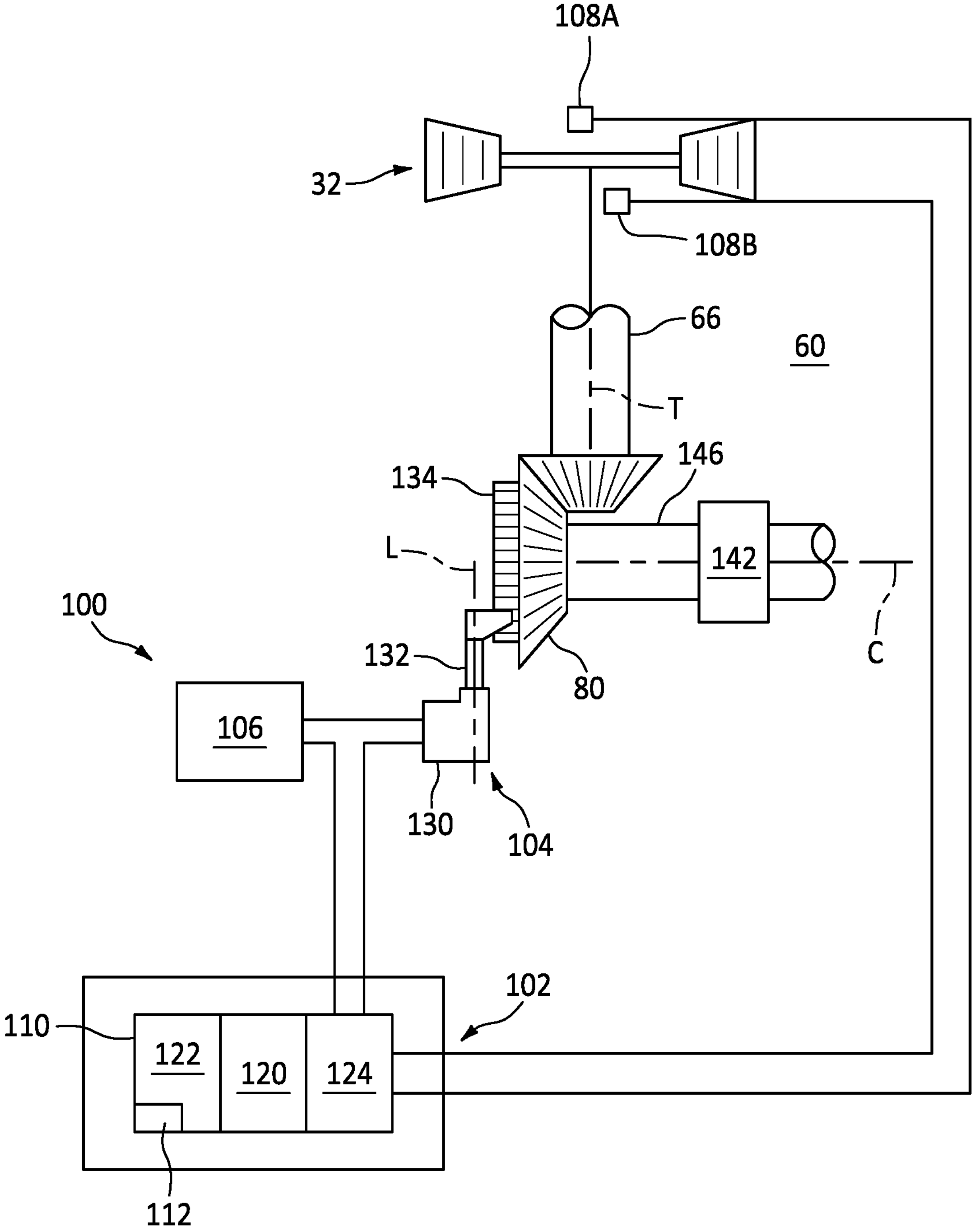
FIG. 4 is a schematic view of a rotor bow mitigation system.

With reference to FIG. 4, a rotor bow mitigation system 100 in one embodiment may be mechanically coupled to the external gearbox 60. Operation of the rotor bow mitigation system 100, in one embodiment, drives the gear 80 which, in turn, drives the towershaft 66 thence the high spool 32. As discussed below, this can be done to periodically or intermittently turn the high spool 32 during cooling to mitigate rotor bow conditions. Although illustrated as driving the spiral bevel gear, the rotor bow mitigation system 100 may alternatively drive any of the gears in the accessory gear train 72.

The rotor bow mitigation system 100 is operated to alleviate rotor distortion such that a bowed rotor is not present in the engine prior to a start or motoring cycle. The rotor bow mitigation system 100 may be operated subsequent to engine shut-down and/or prior to initiating a start sequence. The rotor bow mitigation system 100 may therefore be operated for ground start and ground dry and wet motoring.

The rotor bow mitigation system 100 initiates a low speed incremental rotor turning procedure to alleviate the thermal gradient in the rotor. In one embodiment, the incremental rotor turning procedure may be conducted such that the high spool 32 may be rotated one (1) revolution every 10-15 minutes. That is, the high spool 32 need only be rotated sufficiently to disturb the thermal gradient that otherwise may cause a rotor bow condition. Even intermittent rotation of the high spool 32 has been found to disturb the thermal gradient and minimize rotor bow conditions. Further, the one revolution can be in increments, such as 90 degree rotations, such that a different portion of the rotary component is exposed to the high temperature of the thermal gradient during cooling, and therefor rotor bow in any particular direction is mitigated.

The rotor bow mitigation system 100 may include a control system 102, a linear actuator 104, and a power source 106. The control system 102 generally includes a control module 110 that executes logic 112 to control the low speed motoring procedure. The functions of the logic 112 are disclosed in terms of functional block diagrams, and it should be appreciated that these functions may be enacted in either dedicated hardware circuitry or programmed software routines capable of execution in a microprocessor-based electronics control embodiment. In one example, the control system 102 may be a portion of a flight control computer, a portion of a Full Authority Digital Engine Control (FADEC), a stand-alone unit, or other system. With these components, rotor bow mitigation system 110 can be configured to repeatedly actuate a linear actuator to intermittently rotate a component such as a high spool of the gas turbine engine, for example during cooling, to mitigate rotor bow conditions.

The control module 110 typically includes a processor 120, a memory 122, and an interface 124. The processor 120 may include any type of microprocessor having desired performance characteristics. The memory 122 may include any computer readable medium which stores data and control algorithms such as the logic 112 as described herein. The memory 122 may retain data between shutdowns of the gas turbine engine. The interface 124 facilitates communication with other components such as the linear actuator 104, on-board sensors 108, e.g., a thermometer, speed sensor, cockpit instruments, various onboard computer systems as well as remote systems such as a test stand, ground station, Health and Usage Monitoring Systems (HUMS), or other systems. The sensor inputs for determining the engine bow threat can utilize various criteria. For example, temperature of the machine relative to ambient conditions or an algorithm based on the time the engine was operated, e.g., a sensor that senses the amount of thermal energy stored in the engine that will dissipate after shutdown and may have the potential to create a thermal mismatch of the rotor. In one embodiment, one sensor 108A may be located adjacent to the upper portion of the high spool 32 and another sensor 108B may be located adjacent to a lower portion the high spool 32 to obtain a temperature difference therebetween.

The linear actuator 104 provides axial motion along an axis L. The linear actuator 104 may be operated by the power source 106 which may provide power mechanically, electromechanically, piezo-electrically, pneumatically, hydraulically, and/or combinations thereof. In one embodiment, bleed air from the gas turbine engine 20 may be collected in an accumulator which operates as the power source 106, and can then be released intermittently as controlled by the logic 112.

The linear actuator 104 may include an actuator 130 such as a hydraulic cylinder, a rack and pinion system, a ball screw, or any type of device capable of providing controlled axial motion to actuate a piston 132 along the axis L. The linear actuator 104 may be readily installed within or on the accessory drive gearbox casing 62 to facilitate maintenance thereof.

Actuation and intermittent rotation of the rotary component of the gas turbine engine, such as high spool 32, is disclosed herein as accomplished utilizing linear actuator 104. Such an actuator is favorable because of low cost and mechanical simplicity. It should be appreciated, however, that other types of actuators can also be used to intermittently rotate the rotary component or high spool 32, well within the broad scope of this disclosure.

Figure 5:
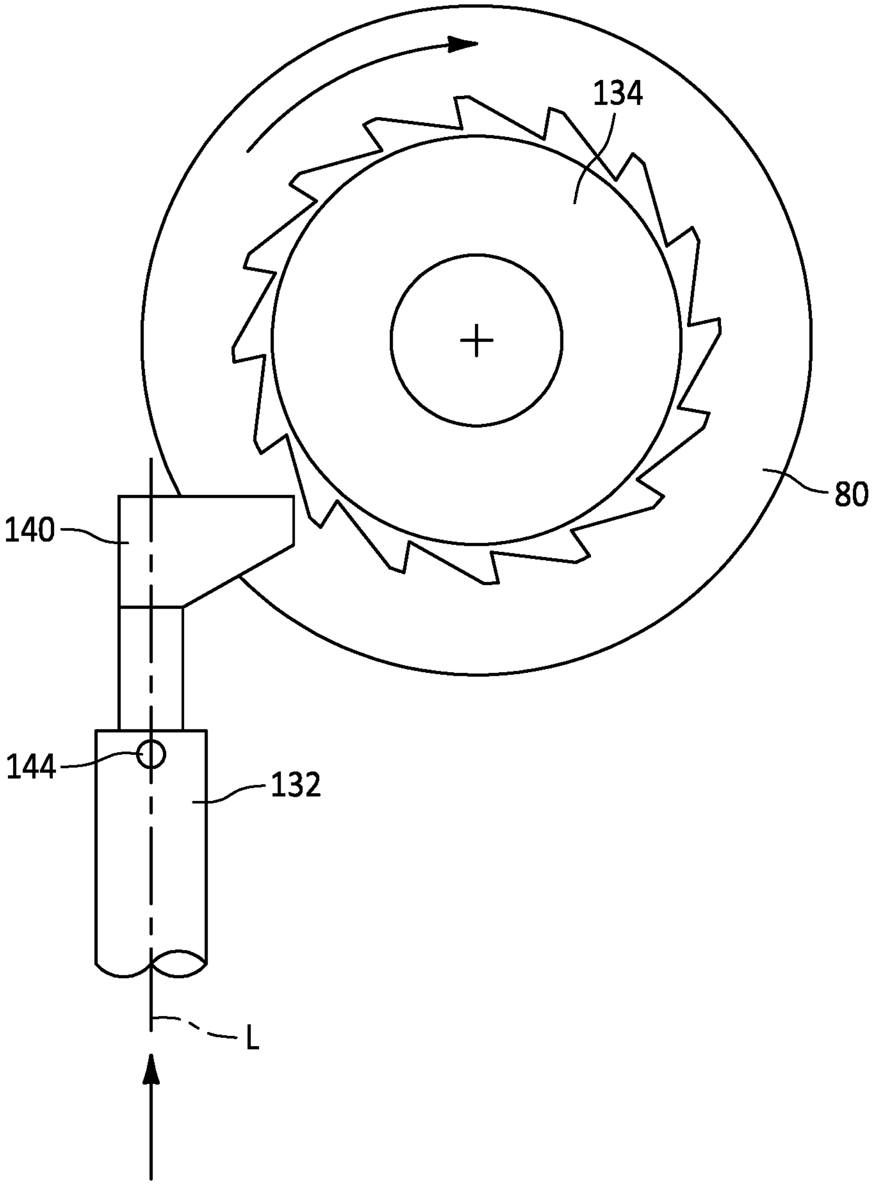
FIG. 5 is a sectional view of a linear actuator of the rotor bow mitigation system in a disengaged position according to one embodiment.

With reference to FIG. 5, in one embodiment, upon extension, the piston 132 selectively engages a ratchet wheel 134 on the gear 80 of the accessory gear train 72 to selectively drive the towershaft 66 to thence rotate the high spool 32 to mitigate rotor bow conditions. Alternatively, the piston 132 may selectively engage the ratchet wheel 134 upon retraction.

Figure 6:
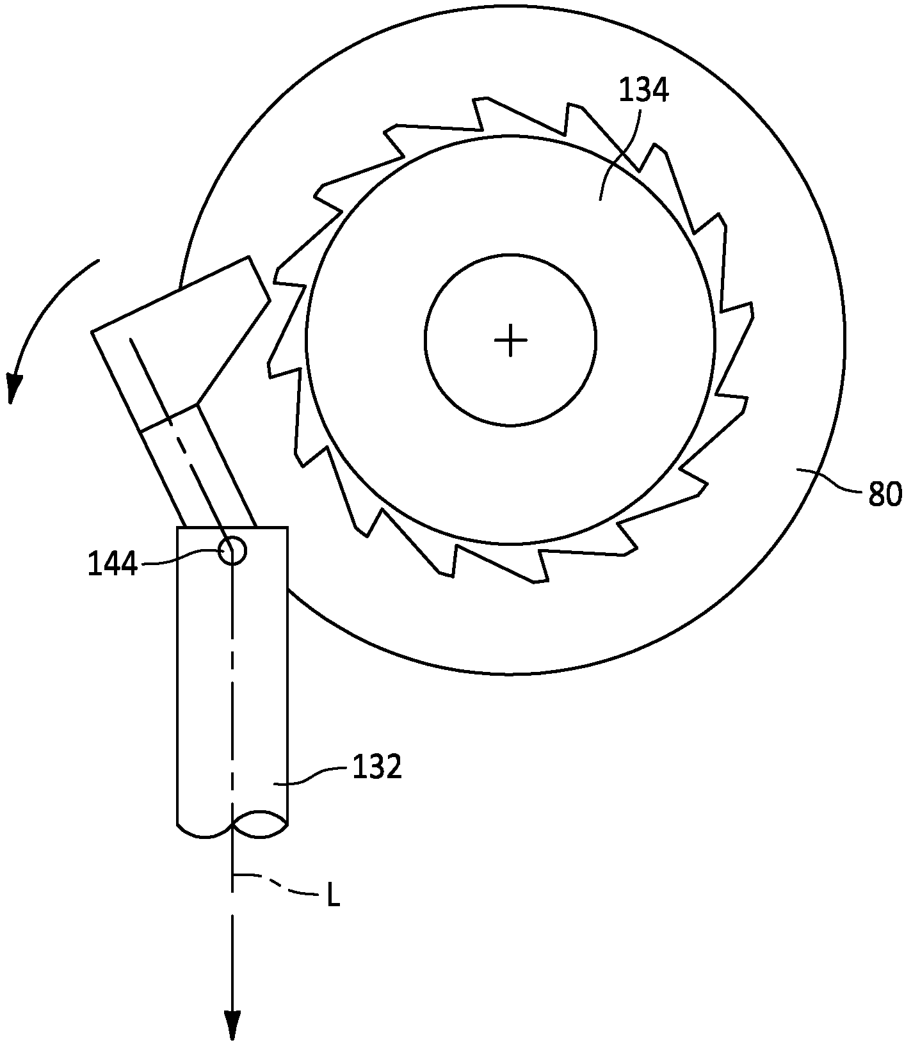
FIG. 6 is a sectional view of a linear actuator of the rotor bow mitigation system in an engaged position according to one embodiment.

The piston 132 may include a pawl 140 or other engagement member that selectively engages the ratchet wheel 134. That is, the pawl 140 is not normally in contact with the ratchet wheel 134 as schematically shown in FIG. 5. When extending, the pawl 140 is locked into a position to then engage the teeth and rotate the ratchet wheel 134 which rotates the gear 80. That is, the piston 132 pushes the ratchet wheel 134 via the pawl 140. Upon retraction, the pawl 140 can pivot about a pivot 144 (FIG. 6) such as a pin or other mechanism to disengage from the teeth of the ratchet wheel 134 without imparting a rotation to the ratchet wheel 134. The pawl 140 provides for one-way rotation the ratchet wheel 134. Although the pawl and ratchet arrangement is schematically illustrated in the disclosed embodiment, various one-way activation mechanisms may be utilized with the linear actuator 104.

In an alternate embodiment, the pawl 140 may directly engage the gear 80. The gear 80 may alternatively, or additionally, be mounted to a gear shaft 146 that includes a one-way clutch 142 or other mechanism that permits the gear 80 to be rotated by the rotor bow mitigation system 100 but is otherwise disconnected from the accessory gear train 72 so that the entirety thereof need not be driven.

In another alternate embodiment, the ratchet wheel 134 may be mounted to the high spool 32 to directly rotate the high spool 32. In this embodiment, the linear actuator 104 may be located in an area that also provides a Borescope Inspection (BSI) port which is typically located to facilitate maintenance accessibility.

Figure 7:
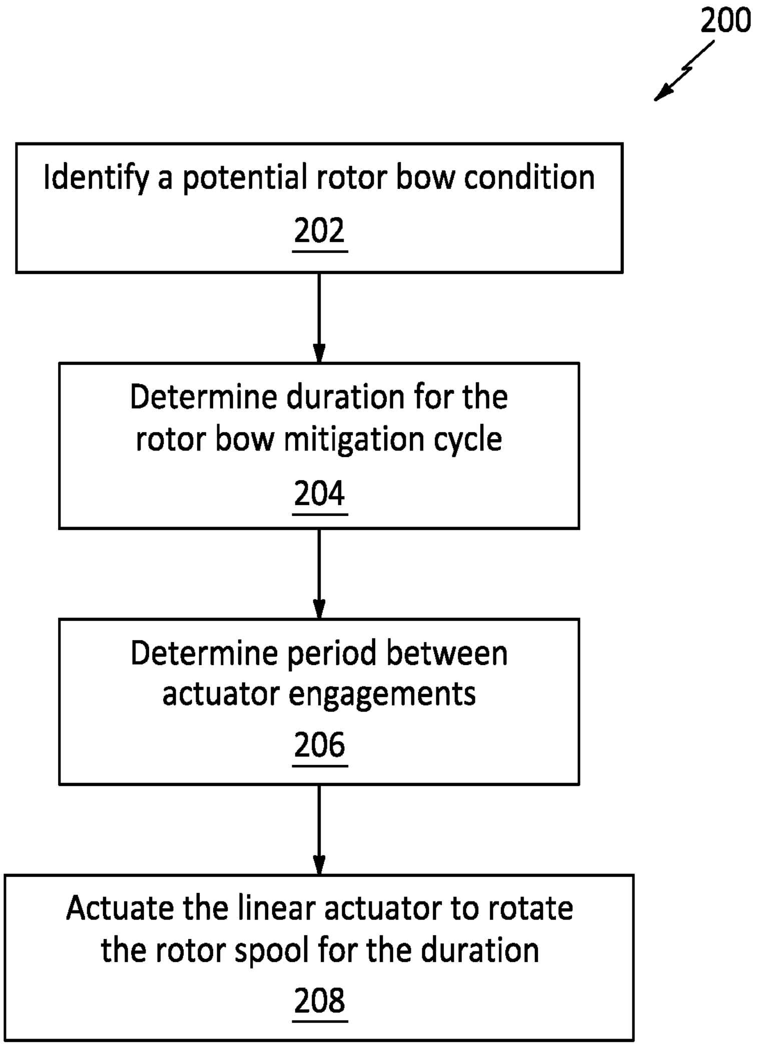
FIG. 7 is a flow chart of functional block diagrams illustrating a method for operation of the rotor bow mitigation system.

With reference to FIG. 7, a method 200 for operation of the rotor bow mitigation system 100 is disclosed in terms of functional block diagrams. The logic 112 includes programmed software routines capable of execution in various microprocessor based electronics control embodiments and is represented herein as block diagrams. These functions may be enacted in either dedicated hardware circuitry or programmed software routines capable of execution in a microprocessor-based electronics control embodiment.

Initially, algorithms in the control system 102 identify a potential rotor bow condition from data provided by, for example, one or more sensor inputs (202). The potential rotor bow condition may be determined by, for example, an aircraft sensor, a temperature of a static component, the differential temperature between the sensors 108A, 108B, a time from shut-down, an idle operation time of the engine prior to the previous shutdown, a pressure within the power source 106, etc. Because the magnitude of rotor distortion exhibits a predictable profile as a function of time, the rotor bow mitigation cycle can be prescribed. Also, the more time spent by the engine at a low power setting (e.g. while taxiing or idling) prior to shut-down, the less time is required to alleviate rotor distortion (i.e. the lower the duration of the prescribed rotor bow mitigation cycle).

Next, using the data received in the control system 102, a duration for the rotor bow mitigation cycle (204) and a period between actuator engagements (206) may be determined. The duration and period may be determined by querying a lookup table or other suitable data structure, formula, etc., that provides a duration value for the rotor bow mitigation cycle. The lookup table may be pre-calculated and stored in memory for subsequent access. In one embodiment, the lookup table is determined via engine testing and analysis to determine the rotor bow mitigation cycle required to alleviate rotor distortion caused by known initial conditions. The linear actuator 104 may alternatively be mechanical-triggering for an actuation cycle at a fixed interval. Alternatively, the linear actuator 104 may be pre-programmed or triggered by the FADEC to operate autonomously according to a FADEC defined period and duration (e.g., one actuation every X seconds for Y minutes). The period and duration may be defined by the FADEC after engine shutdown and sent to the control system 102 such that the FADEC may thereafter be depowered.

Next, the control system 102 actuates the power source 106 to repeatedly actuate the linear actuator 104 for the calculated or otherwise determined or pre-determined duration (208) at the calculated, determined or pre-determined period (206). The power source 106 may operate intermittently such as by a selective release of pressure from an accumulator. Each release of pressure from the accumulator, for example, extends the piston 132 to drive the ratchet wheel 134 on the surface of the gear 80 to thereby drive the towershaft 66, thence the high spool 32. The linear actuator 104 may then retract under its own power without rotating the ratchet wheel 134 due to the pawl 140. Alternatively, the linear actuator 104 may be actively retracted. The extend—retract cycle then repeats over the predetermined duration to mitigate rotor bow conditions. As used herein, the intermittent turning of the high spool 32 while the engine is not running, and without introduction of fuel and an ignition source, allows the spool to cool substantially uniformly through passive heat transfer which mitigates or prevents a bowed rotor state or condition such that the high spool 32 cools, without bowing, to a point wherein a normal start sequence can be implemented without a bowed rotor state. In addition, ambient air can be drawn into the engine while incrementally turning the high spool 32 to mitigate or help prevent a potential bowed rotor condition. That is, the rotor bow mitigation system 100 moves the rotor to achieve a thermally balanced rotor through passive heat transfer and cooling.

The system and method described herein may minimize the time required to alleviate rotor distortion due to thermal effects. Usage of a linear actuator facilitates installation in the accessory drive gearbox to provide for retrofit potential. Further, intermittent operation of the linear actuator also minimizes the heretofore necessity of heavier weight drive components such as electric motors, etc., as intermittent rotation of the high spool 32 has been found to disturb the thermal gradient sufficient to minimize rotor bow conditions.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A rotor bow mitigation system for a gas turbine engine, comprising:

an actuator;

a power source; and a control system in communication with the actuator, wherein the control system actuates the power source to repeatedly actuate the actuator for a duration of time to intermittently rotate a rotary component of the gas turbine engine, and wherein the control system is configured to obtain temperature data from a sensor located adjacent to an upper portion of the rotary component at an axial position along the rotary component and a sensor located adjacent to a lower portion of the rotary component at the axial position along the rotary component to obtain a temperature difference therebetween, and to actuate the actuator based upon the temperature difference.

2. The system as recited in claim 1, wherein the actuator is a linear actuator mounted on or within an accessory drive gearbox casing of the gas turbine engine.

3. The system as recited in claim 2, further comprising a ratchet wheel driven by the linear actuator, and a pawl that extends from a piston of the linear actuator.

4. The system as recited in claim 3, wherein the pawl selectively engages the ratchet wheel upon extension of the piston.

5. The system as recited in claim 4, wherein the pawl is not in contact with the ratchet wheel when the piston is in a retracted position.

6. The system as recited in claim 5, wherein the ratchet wheel extends from a gear of an external gearbox.

7. The system as recited in claim 6, wherein the gear drives a towershaft connected to the rotary component.

8. The system as recited in claim 3, wherein the pawl selectively engages the ratchet wheel upon retraction of the piston.

9. The system as recited in claim 1, wherein the power source is pneumatic, hydraulic or electric.

10. The system as recited in claim 1, wherein the rotary component is a high spool of the gas turbine engine.

11. A gas turbine engine, comprising:

a rotary component;

an external gearbox;

a towershaft mechanically connected to the rotary component and the external gearbox and configured to operate at least one accessory during normal operation of the gas turbine engine; and a rotor bow mitigation system in selective mechanical connection with the external gearbox, wherein the rotor bow mitigation system is configured to repeatedly actuate an actuator mounted on or within the external gearbox to intermittently rotate the towershaft such that the towershaft intermittently rotates the rotary component of the gas turbine engine to mitigate rotor bow conditions, and further comprising a Full Authority Digital Engine Control (FADEC) in communication with the rotor bow mitigation system to actuate a power source in communication with the rotor bow mitigation system to repeatedly actuate the linear actuator for a duration of time to intermittently rotate the rotary component of the gas turbine engine, wherein the FADEC is configured to obtain temperature data from a sensor located adjacent to an upper portion of the rotary component and a sensor located adjacent to a lower portion of the rotary component to obtain a temperature difference therebetween, and to actuate the actuator based upon the temperature difference.

12. The gas turbine engine as recited in claim 11, wherein the external gearbox is an accessory gearbox.

13. The gas turbine engine as recited in claim 11, wherein the rotary component is a high spool of the gas turbine engine.

14. The gas turbine engine as recited in claim 11, wherein the actuator is a linear actuator.

15. The gas turbine engine as recited in claim 11, further comprising a ratchet wheel within the external gearbox, the ratchet wheel driven by the actuator to drive a gear meshed with a gear train of the external gearbox, wherein the gear is mounted to a gear shaft that includes a mechanism that permits the gear to be rotated by the rotor bow mitigation system but is otherwise disconnected from the gear train so that the entirety thereof need not be driven by the rotor bow mitigation system.

16. The gas turbine engine as recited in claim 15, wherein the gear is a spiral bevel gear that drives the accessory gear train.

17. A method of rotor bow mitigation for a gas turbine engine, comprising:

identifying a potential rotor bow condition;

determining a duration for a rotor bow mitigation cycle; and intermittently actuating an actuator of a rotor bow mitigation system in selective mechanical connection with a gear within an accessory gearbox to intermittently rotate a rotary component of the gas turbine engine to mitigate rotor bow conditions, wherein identifying the potential rotor bow condition comprises obtaining temperature data from a sensor located adjacent to an upper portion of the rotary component at an axial position along the rotary component and a sensor located adjacent to a lower portion of the rotary component at the axial position to obtain a temperature difference therebetween, and wherein the intermittently actuating step comprises actuating the actuator based upon the temperature difference.

18. The method as recited in claim 17, wherein intermittently actuating the linear actuator utilizes bleed air from the gas turbine engine collected in an accumulator which is then released intermittently.

* * * * *